(No Model.)

M. S. THOMPSON & H. A. LEE.
DEVICE FOR FEEDING SALT OR COMPRESSED FEED TO CATTLE.

No. 342,885. Patented June 1, 1886.

Witnesses
Geo Wadman
Chas. S. Ward.

Inventor
Mark S. Thompson
Henry A. Lee
by his attorneys,
Gifford & Brown

UNITED STATES PATENT OFFICE.

MARK S. THOMPSON AND HENRY A. LEE, OF NEW YORK, N. Y.; SAID THOMPSON ASSIGNOR TO SAID LEE.

DEVICE FOR FEEDING SALT OR COMPRESSED FEED TO CATTLE.

SPECIFICATION forming part of Letters Patent No. 342,885, dated June 1, 1886.

Application filed January 28, 1886. Serial No. 190,067. (No model.)

*To all whom it may concern:*

Be it known that we, MARK S. THOMPSON and HENRY A. LEE, of New York, in the county and State of New York, have invented a certain new and useful Improvement in Devices for Feeding Salt or Compressed Feed to Cattle, of which the following is a specification.

Our improvement relates to a hopper-shaped device in which a block or cake of salt or feed is placed, and which has at the lower end an oblique opening and a ledge adjacent to the opening for the support of the block or cake of salt or feed. The cattle have access to the block or cake of salt or feed through the oblique opening, and as such block or cake is consumed at the lower end the remaining portion descends through the oblique opening of the hopper. As such hopper has been heretofore constructed, the block or cake of salt or feed has been free to fall out as soon as its upper end got below the upper portion of the oblique opening in the bottom of the hopper, and owing to this much waste of salt or feed ensues.

The object of our improvement is to prevent the falling out of the block or cake of salt or feed after the upper end gets below the upper portion of the oblique opening in the bottom of the hopper.

To this end our improvement consists in a block or cake of salt or feed and a hopper so combined that the sides of the block or cake and the sides of the hopper will interlock, and the sides of the hopper will prevent the block or cake from falling forward even after the block or cake gets below the upper part of the oblique opening in the bottom of the hopper.

Figure 1:
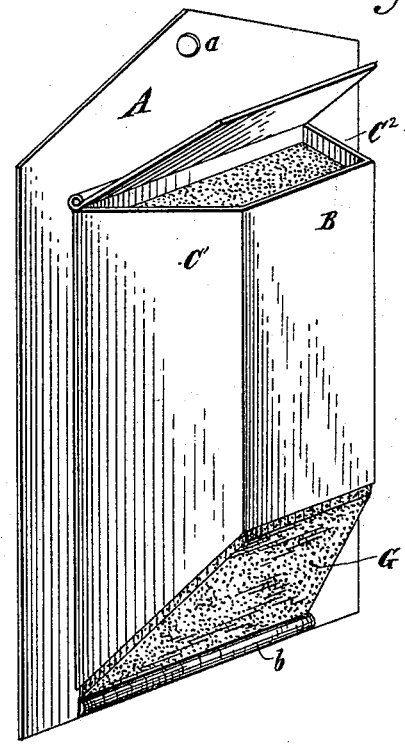
Figure 2:
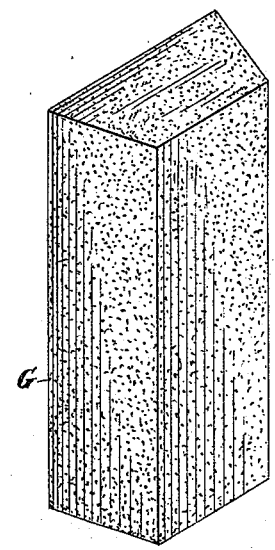
Figure 3:
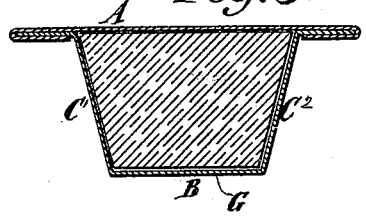
Figure 4:
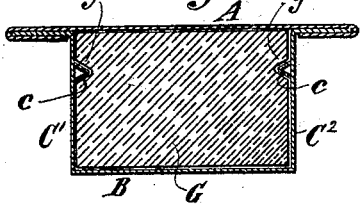

In the accompanying drawings, Figure 1 is a perspective view of a hopper and block or cake of salt or feed made according to our improvement. Fig. 2 is a perspective view of the block or cake. Fig. 3 is a transverse section of the same. Fig. 4 is a similar transverse section illustrating a modification in the sides of the hopper and block or cake.

Similar letters of reference designate corresponding parts in all the figures.

A designates the back of the hopper. It is provided with a hole, $a$, or other means whereby it may be hung upon a wall or other support.

B designates the front of the hopper, and C' C² designate the sides of the hopper. The sides are chamfered off obliquely from the front to the back at the lower end, and the lower part of the front is much higher than the lower part of the back; consequently an oblique opening is formed at the bottom of the hopper. On the back of the hopper, below the oblique opening just mentioned, a ledge or rib, $b$, is formed. A hinge cover, D, is arranged at the top opening of the hopper, being connected to the back and adapted to rest upon the top edge of the front and sides.

G designates a block or cake of salt or feed. It is of approximately the same shape and size as the interior of the hopper. It may be inserted at the top of the hopper by raising the hinge-cover. Its lower end will rest upon the ledge or rib $b$. It need not have an oblique lower end; but after use the end will become oblique, owing to the consumption of the protruding portion by the cattle.

The novel feature of our improvement consists in the form of the sides of the hopper and the sides of the block or cake.

In Figs. 2 and 3 the sides of the hopper converge toward the front, and the sides of the block or cake correspondingly converge toward the front; consequently the sides of the hopper interlock or engage with those of the block or cake in such manner that they will prevent the block or cake from falling forward even after the upper end of the latter gets below the upper part of the oblique opening in the bottom of the hopper.

In Fig. 4 the sides of the hopper are approximately parallel, but are made to extend toward each other by means of ribs $c$ on the inner surface. The sides of the block or cake are likewise parallel, but are provided with grooves $g$, corresponding to the ribs $c$ in the sides of the hopper. The ribs $c$ interlock with the grooves $g$, and consequently prevent the block or cake from falling forward after the upper end of the latter gets below the upper part of the oblique opening in the bottom of the hopper.

The hoppers may be made of any suitable material—such, for instance, as metal.

What we claim as our invention, and desire to secure by Letters Patent, is—

A hopper for salt or feed having an oblique opening at the bottom, a ledge below said opening, and sides extending toward each other so as to interlock or engage a block of salt or feed, substantially as specified.

MARK S. THOMPSON.
    HENRY A. LEE.

Witnesses:
 EDWIN H. BROWN,
 DANIEL H. DRISCOLL.